United States Patent
Voss et al.

(10) Patent No.: US 8,982,247 B2
(45) Date of Patent: Mar. 17, 2015

(54) ALTERING FOCUS LENS MAGNIFICATION IN A VIDEO FRAME

(75) Inventors: Shane D. Voss, Fort Collins, CO (US); Jason Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/879,798

(22) PCT Filed: Oct. 22, 2010

(86) PCT No.: PCT/US2010/053778
§ 371 (c)(1),
(2), (4) Date: Apr. 16, 2013

(87) PCT Pub. No.: WO2012/054059
PCT Pub. Date: Apr. 26, 2012

(65) Prior Publication Data
US 2013/0201368 A1   Aug. 8, 2013

(51) Int. Cl.
*H04N 5/262* (2006.01)
*H04N 5/232* (2006.01)
*G03B 3/02* (2006.01)

(52) U.S. Cl.
CPC .............. *H04N 5/23296* (2013.01); *G03B 3/02* (2013.01); *H04N 5/23212* (2013.01)
USPC ..................................................... 348/240.2

(58) Field of Classification Search
CPC ............................ H04N 5/23296; H04N 5/232
USPC ..................................... 348/240.1–24.3, 240.99
See application file for complete search history.

(56) References Cited

U.S. PATENT DOCUMENTS

| 6,654,506 B1 | 11/2003 | Luo et al. |
| 2007/0165103 A1* | 7/2007 | Arima et al. ............... 348/14.01 |
| 2008/0165274 A1 | 7/2008 | Toguchi |
| 2010/0110568 A1 | 5/2010 | Margolis |
| 2012/0069205 A1* | 3/2012 | Dowski et al. ............ 348/208.99 |
| 2012/0162384 A1* | 6/2012 | Vesely et al. .................... 348/47 |
| 2013/0055087 A1* | 2/2013 | Flint ............................. 715/723 |

FOREIGN PATENT DOCUMENTS

| JP | 57106278 A | 7/1962 |
| JP | 11-023983 A | 1/1999 |
| JP | 11-234482 A | 8/1999 |
| JP | 2000-077502 A | 3/2000 |
| JP | 2008/0412405 A | 2/2008 |
| KR | 10-2007-0053595 A | 5/2007 |

OTHER PUBLICATIONS

International Search Report and Written Opinion received in related PCT Application No. PCT/US2010/053778, mailed Jul. 28, 2011, 9p.

* cited by examiner

*Primary Examiner* — Mekonnen Dagnew
(74) *Attorney, Agent, or Firm* — Hewlett-Packard Patent Department

(57) ABSTRACT

A focus lens is moved to a position within a range of focus lens positions. A video frame is captured with the focus lens at that position. The magnification of the first video frame is altered according to a maximum magnification threshold associated with the range of focus lens positions.

14 Claims, 5 Drawing Sheets

ALTERING FOCUS LENS MAGNIFICATION IN A VIDEO FRAME

BACKGROUND

Many camera devices offer video recording with continuous focus enabled. With continuous focus enabled, the focus motor on the camera moves the focus lens through a range of focus positions during a focus scan. Due to lens optics them may be an effect of magnification as the lens moves from one position to another. The magnification effect appears as if a zoom operation is occurring.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing particular feature, structure, or characteristic included in at least one implementation of the invention. Thus, phrases such as "in one embodiment" or "in an alternate embodiments" appearing herein describe various embodiments and implementations of the invention, and do not necessarily all refer to the same embodiment, However, they are also not necessarily mutually exclusive.

DETAILED DESCRIPTION

Moving a focus lens to different positions within an image capture device changes its focal length, which modifies the angle of view. The effect of zoom magnification caused by moving the focus lens into different positions can be distracting and undesirable when recording a video. For example, videos recorded with continuous focus enabled may show a wobbling magnification whenever continuous focus is run on the camera. A similar magnification effect can also occur right before a still image capture when the focus motor performs a sweep to find the best focus position for the still image capture.

The magnification effect described above can be reduced with optimal lens designs. However, the cost for the optimal lens can be prohibitive. Embodiments described herein automatically crop and resize video frames to reduce or eliminate zoom magnification. The term "video frame" is used herein generally to refer to .any image frame that is captured in succession with other frames for display as a live view or a video segment. For example a digital still camera might not have a video recording mode, but it may offer a live view of an image scene on the rear display (e.g., LCD) as an alternative to viewing the image scene through a viewfinder. Thus, for purposes herein, a live view display is sufficiently similar to video, such that frames captured and displayed as part of a live view are referred to herein as video frames.

Figure 1:
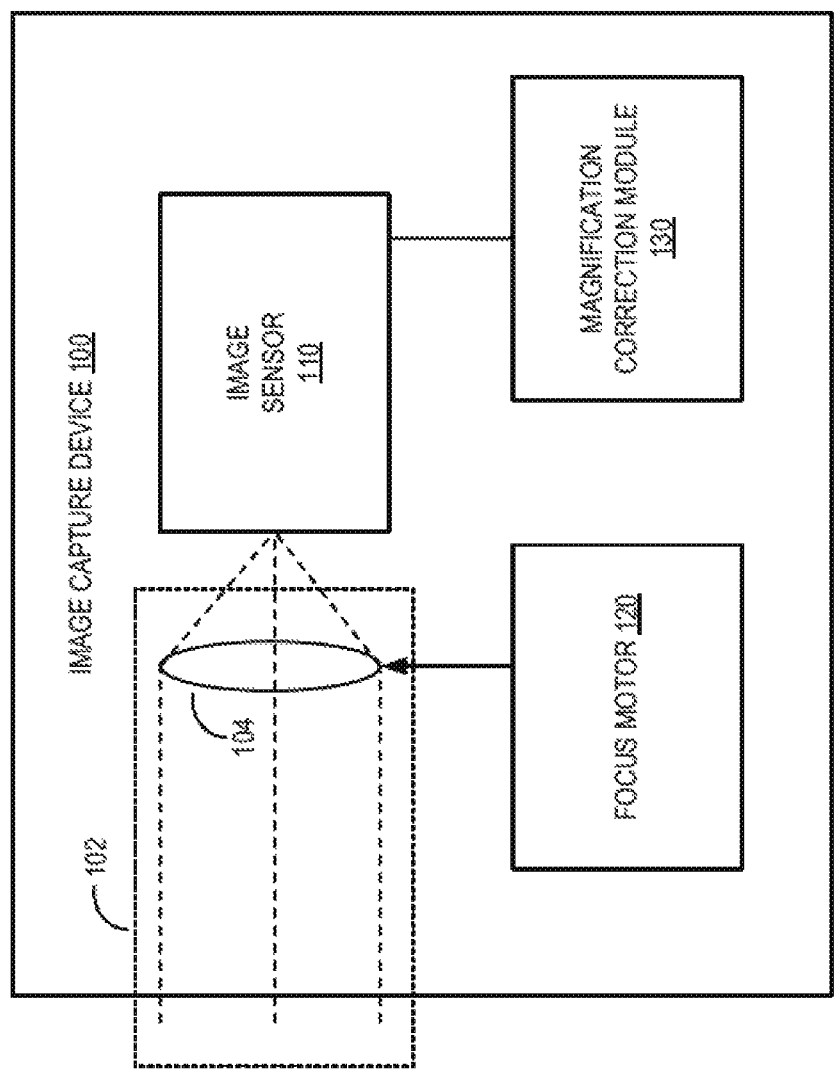
FIG. 1 is a block diagram illustrating an image capture device according to various embodiments.

FIG. 1 is a block diagram illustrating a system according to various embodiments. FIG. 1 includes part outer components, modules, etc. according to various embodiments. However, in different embodiments, other components, modules, arrangements of components/modules etc, may be used according to the teachings described herein. in addition, various components, modules, etc. described herein may be implemented as one or more software modules, hardware modules, special-purpose hardware (e.g., application specific hardware, application specific integrated circuits (ASICs), embedded controllers. hardwired circuitry, etc.), or some combination of these.

In FIG. 1, image capture device 100 may be a digital camera, a digital video camera, a cell phone camera, smartphone camera, or any other device capable of converting optical images to digital images. For example, image capture device 100 may have a video recording function. However, embodiments described herein may be practiced on image capture device 100 even if it does not have a video recording function. For example, if mage capture device 100 is a digital still camera, zoom magnification appearing on a live view display can be corrected prior to capture of a still image.

Optical assembly 102 produces optical images that are captured and converted to digital images by image sensor 110. During a focus scan, focus motor 120 moves focus lens 104 within a range of focus lens positions within optical assembly 102. A focus scan might occur when continuous focus is enabled while operating in a video mode. A focus scan can also occur when device 100 attempts to focus on a subject prior to capturing a still image. Focus scans might be triggered for reasons other than those described above. For each captured video frame, magnification correction module 130 determines whether the frame satisfies a maximum magnification threshold for the range of focus lens positions. If the frame fails to satisfy the maximum magnification thresholds, then the magnification of the frame is changed.

Figure 2A:
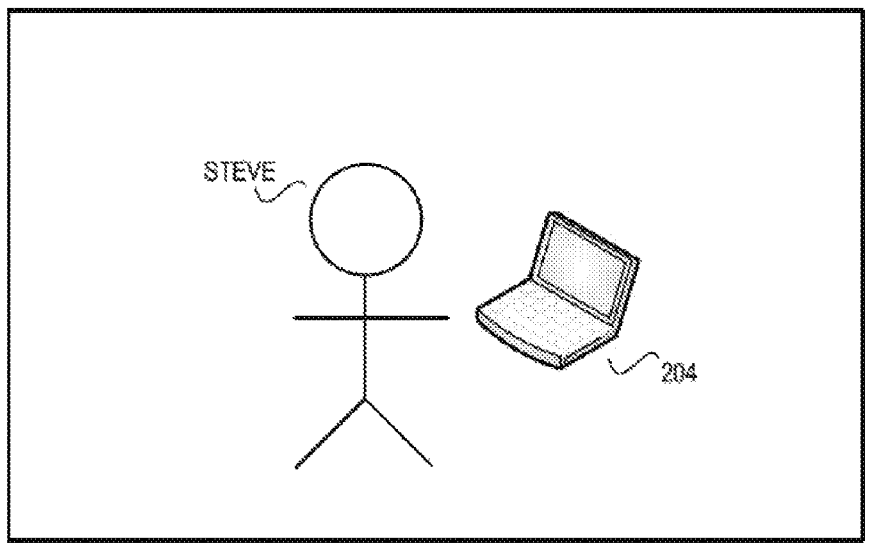
FIGS. 2A and 2B are block diagrams illustrating image frames according to various embodiments.
Figure 2B:
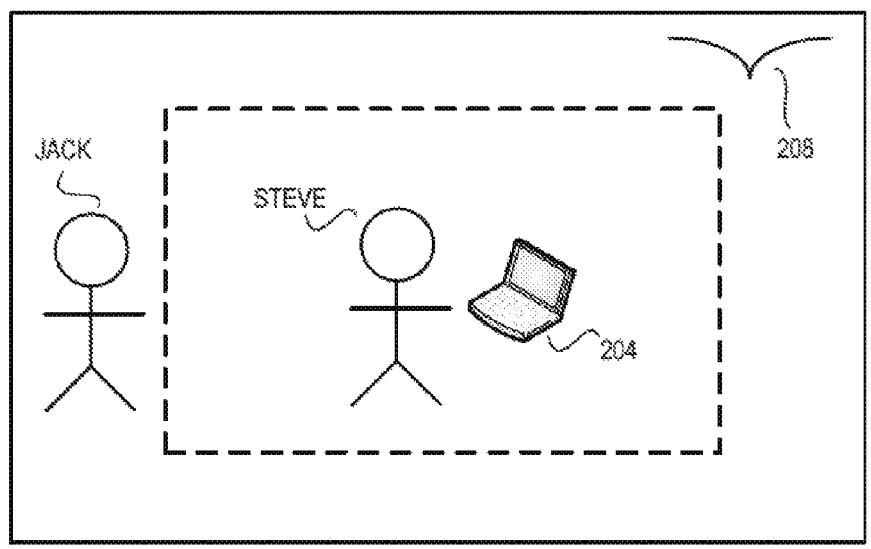

For example, if focus lens 104 is moved to a focus position that causes less than maximum magnification of the video frame, the decreased magnification causes the video frame to include scene elements that would not be included in the video frame if it were captured at maximum magnification. FIGS. 2A and 2B illustrate this by way of example. In the example of FIG. 2A, video frame 200 is captured at maximum magnification. Maximum magnification may occur with focus lens 104 at the macro position, but focus ins 104 could provide maximum magnification at other positions depending on the lens design. The scene area of video frame 200 includes the subject Steve and his laptop 204. When focus lens 104 is moved to a position that decreases the magnification, a subsequent video frame 202, shown in FIG. 2B, not only includes Steve and his laptop 204, but also includes Jack and a flying bird 208. The change in magnification between frames 200 and 202 is, as described above, a function of moving focus lens 104 as opposed to performing a zoom operation. For this reason, magnification correction module 130 changes the magnification of frame 202 to satisfy the maximum magnification threshold, which is des bed in more detail below.

Figure 3:
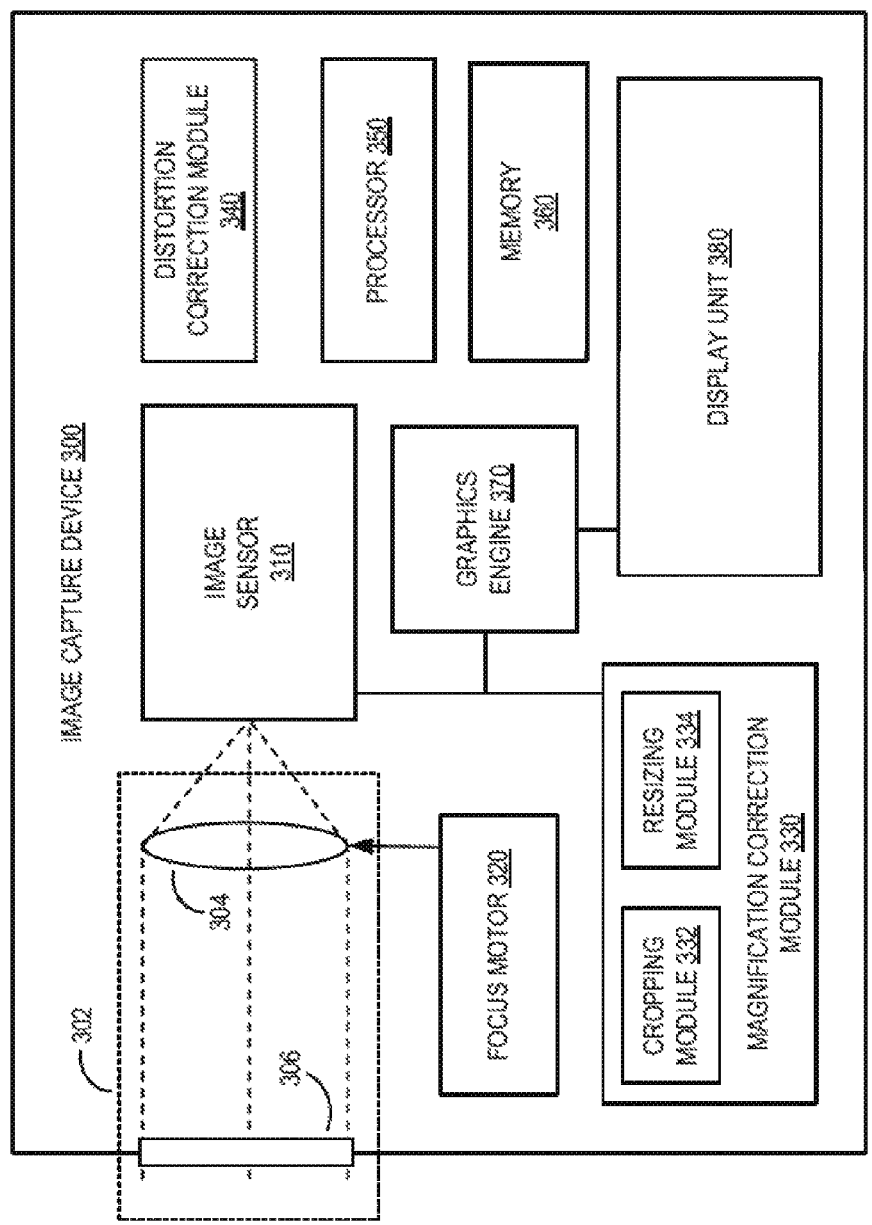
FIG. 3 is a block diagram illustrating an image capture device according to various embodiments.

FIG. 3 is a block diagram of a system according to various embodiments. FIG. 3 includes particular components, modules, etc. according to various embodiments. However, in different embodiments, other components, modules, arrangements of components/modules etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry etc.), or some combination of these.

In FIG. 3, image capture device 300 may be a digital camera, a digital video camera, a cell phone camera, smart hone camera, or any other device capable of converting optical images to digital images. For example, image capture device 100 may include a video recording function. However, embodiments described herein may be practiced with image capture device 100 even if it does not have a video recording function, as described below.

Optical assembly 302 produces optical images that are captured and converted to digital images by image sensor 310. During a focus scan, focus motor 320 moves focus lens 304 within a range of focus lens positions within optical assembly 302. A focus scan might occur when continuous focus is enabled while operating in a video mode. A focus scan can also occur when device 300 attempts to focus on a subject prior to capturing a still image, which might be displayed, for example, as a live view on display unit 380.

For each captured video frame, magnification correction module 330 determines whether the frame satisfies a maximum magnification threshold for the range of focus lens positions. If the frame fails to satisfy the maximum magnification threshold, cropping module 332 crops the video frame to remove elements that would not have been captured at maximum magnification. Referring back to the examples of FIGS. 2A and 2B, cropping module 332 crops frame elements that are outside of the dotted line in frame 202 given that only the elements inside the dotted line (i.e., Steve and laptop 204) correspond to the maximum magnification frame 200, R sizing module 334 then resizes the cropped frame to its original size (i.e., the size of frame 202 prior to cropping).

Magnification correction module 330 could be implemented directly on image sensor 310 in certain embodiments. In other embodiments, magnification correction module 330 could be implemented elsewhere on image capture device 300, such as within graphics engine 370 or display unit 380. In yet other embodiments, magnification correction module 330 could be distributed between a combination of devices, components, such as those described above.

Image sensor 310 may be implemented as a CMOS (complimentary metal-oxide-semiconductor) sensor or as a CCD (charge-couple device) sensor. In embodiments where image censor 310 is a CMOS sensor, image capture device 300 further includes a rolling shutter 306 to expose light to image sensor 310 on a line-by-line basis, also known as a line scan. Image frames, including video frames, captured by a CMOS sensor c s exhibit various distortive effects including, but not limited to, roiling shutter effect, keystone effect, skew, etc. Magnification correction As magnification correction module 330 could enhance such distortive effects. Accordingly, distortion correction module aim reduces distortive effects resulting from changing the magnification of a video frame.

Various modules and/or components illustrated and described in FIG. 3 may be implemented as a compute readable storage medium containing instructions executed by a processor (e.g., processor 350) and stored in a memory (e.g., memory 360). In addition, various module and/or components may be means for achieving the functionality described herein.

Figure 4:
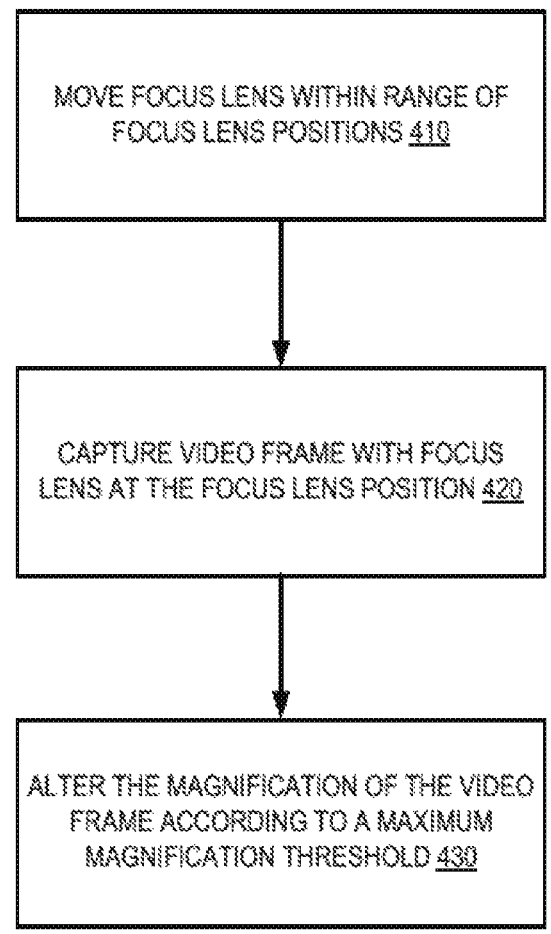
FIG. 4 is a flow diagram Of operation in a system according to various embodiments.

FIG. 4 is a flow diagram of operation in a system according to various embodiments. FIG. 4 includes particular operations and execution order according to certain embodiments. However, different embodiments, other operations, omitting one or more of the depicted operations, and/or proceeding in other orders of execution may also be used according to teachings described herein.

In an image capture device, a focus lens is moved 410 to some position within a range of focus lens positions. The focus lens may be moved in either direction. A video frame is then captured 420 with the focus lens at the aforementioned position. In various embodiments, the movement of the focus tens is due to enablement of continuous automatic focus white operating the device in video mode in some embodiments, the movement of the focus lens is due to the device auto-focusing just prior to capturing a still image. For example, when capturing a still image, video frames are generated for display as a live on the device, eliminating the need to preview the image scene using a traditional viewfinder.

Within the range of focus lens positions is a position at which the magnification from the focus lens is at a maximum. At all other positions, the magnification due to the focus lens is less than the maximum. Thus, when a video frame is captured 420 with the focus lens in a position that results in less than maximum magnification, the magnification of the video frame is altered 430 according to a maximum magnification threshold. To satisfy the maximum magnification threshold, the video frame may be altered 430 to match the maximum video frame magnification for the range of focus lens positions. However, in some embodiments, the maximum magnification threshold may be slightly less than maximum magnification available and thus the video frame might be altered to satisfy the threshold without magnifying the video frame maximally.

Figure 5:
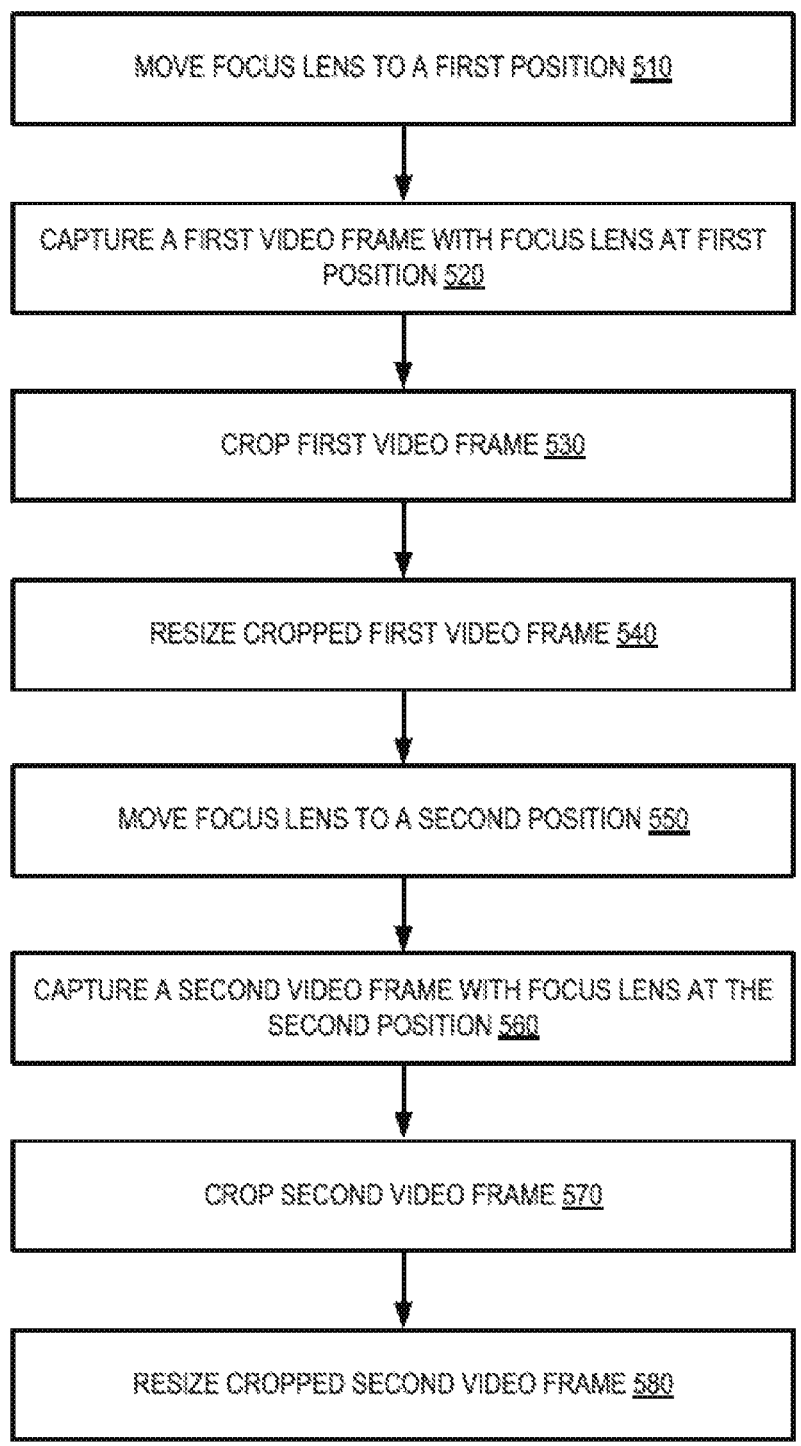
FIG. 5 is a flow diagram of operation in a system according to various embodiments.

FIG. 5 is a flow diagram of operation in a system according to various embodiments. FIG. 5 includes particular operations and execution order according to certain embodiments. However, in different embodiments, other operations, omitting one or more of the depicted operations, and/or proceeding in of other orders of execution may also be used according to teachings described herein.

In an image capture device, a focus lens is moved 510 to a first position within a range of focus liens positions. The focus lens may be moved in either direction. A first video frame is then captured 520 with the focus lens at the first position. In various embodiments, the movement of the focus lens is due to enablement of continuous automatic focus while operating the device in video mode. in some embodiments, the movement of the focus lens is due to the device auto-focusing just prior to capturing a still image. The focus lens could be moved for other reasons in addition to those described above.

Assuming the first focus lens position does not correspond to the maximum magnification point for the range of lens positions, the first video frame is cropped 630 to remove the outer edges of the frame that do not correspond to maximum magnification. Referring again to FIG. 2, Jack and the bird 208 in frame 202 do not correspond to maximum magnification and are, therefore, cropped. Once cropped, the first video frame is resized 540 to its original size (i.e., prior to cropping).

The focus lens then moved 550 to a second position within the range of focus lens positions. Again, the focus lens may be moved in either direction. A second video frame is then captured 560 with the focus lens at the second position. Assuming the second position does not correspond to the maximum magnification point for the range of lens positions, the second video frame is cropped 570 to remove the outer edges of the frame that do not correspond to maximum magnification. Given that the second focus lens position is different than the first focus lens position, the amount of cropping will also be different. In other words, the amount of cropping is a function of the magnification of the frame relative to the magnification at the maximum magnification point. After cropping, the second frame is resized 580 to its original size.

Accordingly, each successive frame in a series of video frames is automatically cropped and resized to match the maximum magnification point (or within a threshold of the maximum magnification point) for the range of focus lens positions, in this way, the effects of zoom magnification may be reduced and/or eliminated.

Various modifications may be made to the disclosed embodiments and implementations of the invention without departing from their scope. Therefore, the illustrations and examples herein should be construed in an illustrative, and not a restrictive sense.

The invention claimed is:

1. A method performed by an image capture device, comprising:
   moving a focus lens to a first position within a range of focus lens positions;
   capturing a first video frame with the focus lens at the first position;
   comparing magnifications of each focus lens position from a plurality of focus lens positions within the range of focus lens positions to determine a maximum magnification point of the plurality of focus lens positions; and
   altering the magnification of the first video frame according to a maximum magnification threshold that is based on the maximum magnification point for the plurality of focus lens positions.

2. The method of claim 1, wherein altering the magnification of the first video frame comprises:
   cropping the first video frame to remove video frame contents that fail to satisfy the maximum magnification threshold; and
   resizing the cropped first video frame to its original size.

3. The method of claim 1, further comprising:
   moving the focus lens to a second position within the range of focus lens positions;
   capturing a second video frame with the focus lens at the second position; and
   altering the magnification of the second video frame according to the maximum magnification threshold for the plurality of focus lens positions.

4. The method of claim 1, wherein the altering of the first video frame is performed by an image sensor on the image capture device.

5. The method of claim 1, wherein the altering of the first video frame is performed by a graphics engine on the image capture device.

6. The method of claim 1, wherein the altering of the first video frame is performed by a display unit on the image capture device.

7. The method of claim 1, wherein the altering of the first video frame is performed by a combination selected from the group consisting of:
   an image sensor,
   a graphics engine,
   a display unit.

8. The method of claim 1, wherein the maximum magnification point corresponds to the focus lens being positioned at macro position.

9. An image capture device, comprising:
   a focus motor to move a focus lens within a range of focus lens positions;
   an image sensor to capture a video frame with the focus lens at a position within the range of focus lens positions; and
   a magnification correction module to:
      compare magnifications of each focus lens position from a plurality of focus lens positions within the range of focus lens positions to determine a maximum magnification point of the plurality of focus lens positions; and
      change the magnification of the video frame to satisfy a maximum magnification threshold based on the maximum magnification point for the plurality of focus lens positions.

10. The image capture device of claim 9, wherein the magnification correction module further comprises:
    a cropping module to remove portions of the video frame that fall outside of a boundary defined by the maximum magnification threshold to create a cropped version of the video frame; and
    a resizing module to resize the cropped version of the video frame to match the size of the video frame prior to cropping.

11. The image capture device of claim 9, wherein the image sensor is a complimentary metal-oxide-semiconductor (CMOS) sensor and the image capture device further comprising:
    a rolling shutter to expose light to the image sensor on a line-by-line basis; and
    a distortion correction module to reduce a keystone effect resulting from changing the magnification of the video frame.

12. The image capture device of claim 9, wherein the magnification alteration means further comprise:
    cropping means to generate a cropped version of the video frame by cropping portions of the video frame that fail to satisfy the maximum magnification threshold; and
    resizing means to resize the cropped version of the video frame to match the size of the video frame prior to cropping.

13. The image capture device of claim 9, wherein the image sensor is a complimentary metal-oxide-semiconductor (CMOS) sensor and the image capture device further comprising:
    shutter means to expose light to the image sensor on a line-by-line basis; and
    distortion correction means to reduce a keystone effect resulting from altering the magnification of the video frame.

14. An image capture device, comprising:
    focusing means to move a focus lens within a range of focus lens positions;
    imaging means to capture a video frame with the focus lens at a position within the range of focus lens positions;
    comparing means to compare magnifications of each focus lens position from a plurality of focus lens positions within the range of focus lens positions to determine a maximum magnification point of the plurality of focus lens positions; and
    magnification alteration means to alter the magnification of the video frame to satisfy a maximum magnification threshold for the plurality of focus lens positions.

* * * * *